United States Patent Office 2,828,010
Patented Mar. 25, 1958

2,828,010

SEED SEPARATION

Johannes Gompper, Buderich, near Dusseldorf, Germany

No Drawing. Application June 7, 1956
Serial No. 589,881

2 Claims. (Cl. 209—8)

This invention relates to seed separation, and more particularly to a process for the magnetic separation of seeds. The process according to the present invention has utility for separating cultural seeds from weed seeds, cultural seeds from cultural seeds, and cultural seeds and weed seeds from cultural seeds.

Processes for the magnetic separation of seeds are known in general. One such process involves moistening a seed mixture with water and thereafter mixing the moistened seed mixture with a powder having magnetic properties after which the magnetic separation takes place according to known techniques. This process is effective where the seed mixture contains weed seeds or the like which have rough husks or which are porous or will swell up when moistened and such seeds are to be separated from smooth cultural seeds contained in the mixture. The weed seeds or the like having the properties just described will, when moistened, cause the mixed-in magnetic powder to adhere to them while the smooth cultural seeds will effectively reject the magnetic powder. Magnetic separation can thus be effective in separating the weed seed or the like from the smooth cultural seeds.

Another known process includes the preliminary step of subjecting a seed mixture to seed shell-cracking action (as by centrifugal force) to crack or otherwise roughen the seed surface of one type of seed contained in the mixture. This type of seed will then be capable of being moistened to a greater degree than a type of seed contained in the mixture in which the shells are not cracked. Magnetic powder will adhere to the seeds having cracked shells to a greater degree than the powder will adhere to the seeds having uncracked shells.

This particular process has utility when it is desired to separate seeds having substantially the same surface smoothness characteristics but different shell hardness characteristics. An example of two types of seeds to which this particular process may be applied is clover seeds and sorrel (Rumex) seeds. When a mixture of these seeds is subjected to shell-cracking action, the softer-shell sorrel seeds will crack before the clover seeds do and the pressure, centrifugal force or the like, can be controlled so that a selective cracking action takes place on the sorrel seeds leaving the clover seeds substantially unaffected by the shell-cracking action.

Still another known process includes the step of applying fat or oil to a seed mixture to coat each seed with a thin layer or fat or oil. Magnetic powder is then mixed in with the coated seeds and will adhere to those seeds of the mixture which have rough shells creating recesses and pits containing fat or oil droplets whereas the smooth-surface seeds in the mixture will reject the magnetic powder. It appears that the thinly deposited layer of fat or oil effects a polishing of the smooth-surface seeds so that they will reject the magnetic powder whereas the recesses and pits in the shells of the rough-shelled seeds retain droplets of fat or oil to which the magnetic powder will adhere.

While processes for the magnetic separation of seeds, such as those described above, are known in general, they are not effective for separating substantially smooth-surface seeds having substantially the same surface hardness. Such a seed mixture may contain different kinds of cultural seeds or, in addition to cultural seeds, may also contain undesired weed seeds having substantially the same surface characteristics as the cultural seeds.

After extensive testing I have found that it is possible to separate one variety of seed from another variety of seed, even though the two seed varieties are mixed together and have substantially the same shell smoothness and hardness, by a magnetic separation process which includes the initial step of moistening the seed mixture with an oil having a viscosity in the range from 8 to 9 Engler. Depending upon the biological variety of the seeds involved, the seeds will collect more or less of the applied oil. Therefore, when magnetic powder is then mixed into the seed mixture, a seed variety capable of collecting the applied oil will cause more of the magnetic powder to adhere to it than does a seed variety which repels the applied oil.

I have found that seeds of culture-clover and Lucerne are of a variety which repel oil having the above-mentioned viscosity. Conversely, Brassica-type seeds such as rapes and turnips; wild clover species such as small flower, honey clover (Mililotus parviflorus) and turned-over clover (Trifolium resupinatum); weed seeds such as snake head, yellow succorg (Helminthia echioides), Amarantmelde (Axyris amarantiodes), goosefoot (Chenipodium), cranes-bill (Geranium), chick weed (Stellaria), and especially the weed seeds of Argentine; and all grass seeds; are moistened by an applied oil having a viscosity as mentioned above so that they will collect magnetic powder when it is mixed in with the oil-moistened mixture.

It is apparent from the examples just described that there are cultural seeds and weed seeds with substantially smooth husks which, after mixing with an oil having a viscosity as mentioned above, will collect magnetic powder added to the mixture whereas other biological varieties of seeds will repel the added magnetic powder. In practicing my process I have found it even more effective to add water to a seed mixture which has been moistened with oil having a viscosity as described above. While it is stated that water is added to the seed mixture moistened with oil, it is to be understood that water may be added at practically the same time. For those biological varieties which repel such an oil, the water effectively removes whatever small oil traces may remain on such seeds thus further insuring that they will not effectively collect magnetic powder when the latter is added to the seed mixture.

However, there are some biological varieties which, though they repel an oil having a viscosity as described above, will be made sticky by water added to the seed mixture even though these seed varieties may have substantially smooth surfaces. Ribgrass (Plantago) is an example of a seed variety which, despite the fact that it will repel an oil having a viscosity as described above, can be made sticky by adding water to the seed mixture. Therefore, the step of adding water to the seed mixture has the advantage that some seeds not moistened by the oil can nevertheless be moistened by the water thus enabling these seeds to be separated from seeds which are not moistened by either the oil or the water. Of course, the water addition is also helpful in causing weed seeds or the like having rough husks to collect magnetic powder added to the seed mixture.

After oil and water have been added to the seed mixture as described above, a fine grade of powder having magnetic properties is mixed into the seed mixture whereupon the applied magnetic powder will adhere to seeds moistened by the oil or the water, or by both, but will not adhere effectively to seeds which repel both the oil and the water. The seed mixture, now containing magnetic powder, is next processed according to known techniques to separate magnetically those seeds having magnetic powder adhering to them from those seeds which have no or substantially no magnetic powder adhering to them.

It is thus seen that I have described a process for separating different varieties of seeds from each other in which I take advantage of the fact that seeds vary, according to their biological variety, in their ability to retain on their surface oil having a viscosity in the range from 8 to 9 Engler and they also vary according to their biological variety in their ability to retain water on their surface. By following the teaching of my invention, it is possible to separate seed varieties wherein the seed surfaces are smooth or at least substantially smooth and have substantially the same shell hardness. This has not been possible according to processes heretofore known.

While I have described an embodiment of my invention, I wish it to be understood that I do not intend to be restricted solely thereto but that I do intend to cover all modifications thereof which would be apparent to one skilled in the art and which come within the spirit and scope of my invention.

What I claim as my invention is:

1. A process of preparing a seed mixture for action by magnetic means to separate one variety of seed contained in said mixture from another variety of seed contained in said mixture wherein said seed varieties have substantially the same surface smoothness but different affinities for an oil having a viscosity in the range from 8 to 9 Engler, said process comprising the steps of applying oil having a viscosity in the range from 8 to 9 to said seed mixture until said seed mixture is moistened by said oil, and then mixing into said moistened seed mixture a powder having magnetic properties whereby more of said magnetic powder will adhere to the seed variety having the greater affinity for said oil than will adhere to the seed variety having the lesser affinity for said oil.

2. A process according to claim 1, including the step of adding water to said seed mixture before said magnetic powder is added to said seed mixture.

References Cited in the file of this patent

UNITED STATES PATENTS 1,043,850     Lockwood _____ Nov. 12, 1912

FOREIGN PATENTS 114,251     Austria _____ Sept. 25, 1929